R. W. SEELYE.
AUTOMOBILE SPRING OILER.
APPLICATION FILED APR. 22, 1918.
1,277,649.
Patented Sept. 3, 1918.
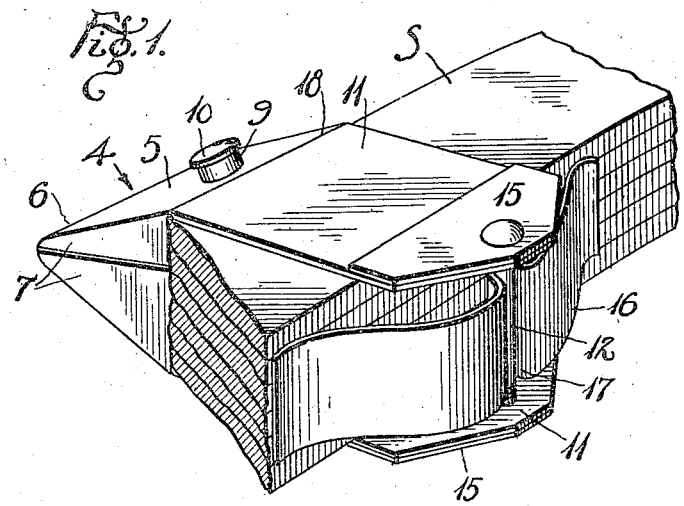
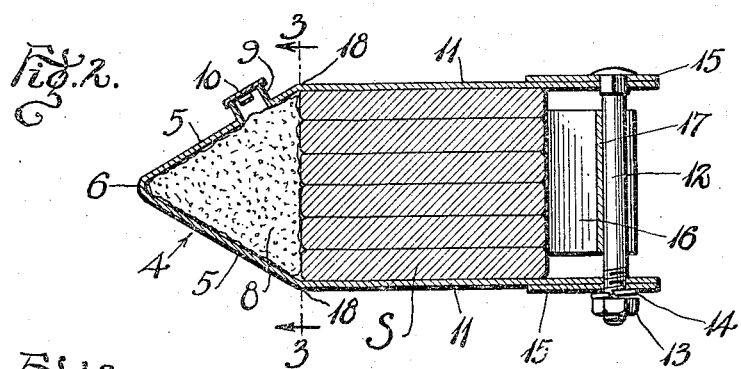
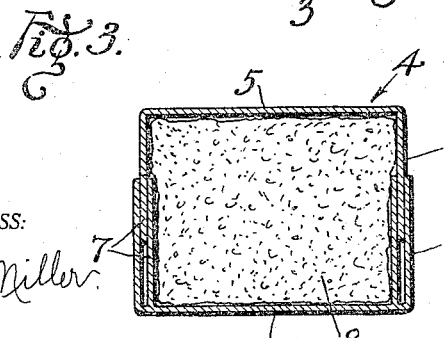
WITNESS:
E. V. Miller
INVENTOR.
Raymond W. Seelye,
BY Monroe E. Miller
ATTORNEY.

UNITED STATES PATENT OFFICE.

RAYMOND W. SEELYE, OF BRAINERD, MINNESOTA.

AUTOMOBILE-SPRING OILER.

1,277,649.  Specification of Letters Patent.  Patented Sept. 3, 1918.

Application filed April 22, 1918. Serial No. 230,015.

*To all whom it may concern:*

Be it known that I, RAYMOND W. SEELYE, a citizen of the United States, and resident of Brainerd, in the county of Crow Wing and State of Minnesota, have invented certain new and useful Improvements in Automobile-Spring Oilers, of which the following is a specification.

The present invention relates generally to lubricators, and aims to provide a device of that character designed for lubricating laminated springs, such as used upon automobiles, and operable for supplying lubricant between the leaves or laminæ in order that their relative sliding movement, due to the flexure of the spring, will not produce objectionable friction and noise.

It is the object of the invention to provide a lubricator or oiler for the purpose indicated which is of novel yet simple and efficacious construction for quick and convenient attachment to various laminated springs to fulfil its office in a satisfactory manner.

Another object is the provision of such a device having means for receiving and retaining oil or other lubricant and feeding it between the leaves of the spring, as the lubricant therebetween is consumed.

A further object is to provide a lubricator of the nature indicated which is adjustable to fit springs of various sizes with equal facility.

The invention has for a still further object a provision of means for holding the lubricator snugly in place, in order to avoid rattling thereof and to enhance lubrication of the spring.

With the foregoing and other objects in view, which will be apparent as the invention is better understood, the invention resides in the construction and arrangement of parts as hereinafter described and claimed, it being understood that changes can be made within the scope of what is claimed without departing from the spirit of the invention.

The invention is illustrated in the accompanying drawing, wherein—

Figure 1 is a perspective view of the device.

Fig. 2 is a vertical longitudinal section thereof.

Fig. 3 is a cross section on the line 3—3 of Fig. 2.

The device embodies lubricant supplying means to fit one side of a laminated spring S against the edges of the leaves, and retaining means for holding the lubricant supplying means in place.

The lubricant holding and supplying means embodies a sponge box or pocket 4, formed of sheet metal or other suitable material, and having divergent top and bottom walls 5 at an angle with one another, and the bend or corner 6 between said walls is bendable in order that said walls can be bent toward or away from one another to adjust the pocket and enlarge or reduce the size of its mouth to correspond to the thickness of the spring. The adjustable walls 5 are provided at their edges with wings 7 bent at an angle therewith, and the wings at the opposite sides are in overlapping relation, to provide extensible side walls for the pocket. The pocket is of triangular form in side elevation, and the wings 7 fit snugly together to prevent leakage therebetween, and to exclude dust and other foreign matter. It is preferable to provide one wall 5 with double wings 7 at the opposite edges to provide slots or recesses therebetween for snugly receiving the wings of the other wall 5 and thereby provide a tight sliding fit between the wings of the two walls 5. An absorbent compressible filler 8 is pressed into the pocket 4, and is preferably a sponge although other material can be used. This filler or sponge in being compressed within the pocket will expand when the walls 5 are bent apart, and furthermore, the filler will have the tendency to expand from between the diverging walls 5 through the mouth, thereby pressing the face of the filler against the edges of the spring leaves. The upper wall 5 has an upstanding filling neck or cup 9, provided with a hinged or removable cover 10, which permits oil or other lubricant to be poured or injected into the pocket to be absorbed by the filler. The lubricant thus fills the pores of the filler and is thus held within the pocket to be fed to the spring.

The retaining means for holding the box or pocket 4 in place with its mouth against the spring, embodies straps or tongues 11 extending from the spaced ends of the walls 5 and forming continuations thereof. These straps 11 are parallel and are disposed at obtuse angles with the walls 5, and extend from the mouth of the pocket to overlap and extend across the upper and lower sides or leaves of the spring. A bolt 12 or other suitable securing element is inserted through the free end portions of the straps 11 which project from that side of the spring opposite the pocket, said straps having apertures for receiving said bolt, and the bolt having a nut 13 at one end. When the bolt is inserted and the nut tightened, this draws the straps 11 toward one another tightly against the spring for clamping the parts in place, and it will be evident that by this arrangement only a single securing element is used. It is preferable to use a spring washer 14 between the nut 13 and corresponding strap 11. If desired, stiffening pieces or plates 15 can be secured to the free end portions of the straps 11 where the bolt 12 extends through, to avoid the bending of the straps at this point. A bowed or double leaf spring 16 is disposed between the bolt 12 and spring S, with the ends of the spring 16 bearing against that side of the spring S opposite the pocket, and the intermediate portion of the spring 16 bearing against the bolt to exert tension against the bolt 12 between the straps 11. The intermediate portion of the spring 16 has a transverse indentation or groove 17 receiving the bolt 12 and serving to hold the spring 16 in position. The spring 16 urges the straps or tongues 11 to move toward that side of the spring S where the spring 16 is located, thereby pulling the pocket 4 and filler 8 snugly against the spring S. This not only holds the lubricant supplying means in most effective position, but also prevents the device from becoming loosened and rattling. The bends or corners 18 between the straps 11 and walls 5 are bendable, whereby the straps 11 can be bent relative to the pocket to accommodate laminated springs of various thicknesses.

At the start, the leaves of the spring S are opened or separated in the usual way and oil injected between them to give the spring its initial supply of lubricant. Then, when the device is applied, preferably near the clevis or clamp which fastens the spring, and oil injected to fill the sponge or filler 8 with oil, the oil will be fed from the filler between the leaves as they become dry. In this way, as the leaves slide relatively during the bending or flexing, the oil between the leaves is consumed and this draws oil from the sponge or filler which presses against the leaves across the crevices between them. This will keep the spring S lubricated to avoid objectionable friction and noise, and the sponge or filler 8 can be kept well saturated through the neck or cup 9 so that it is unnecessary to again open or separate the leaves of the spring S. The box or pocket 4 completely closes the sponge, excepting at the mouth where the sponge fits against the edges of the spring S, and this helps to retain the oil in the sponge, and also protects the sponge from dust and dirt. Furthermore, the sponge is protected so as to allow washing of the spring without damage to the oiling rig.

By bending the walls 5, the pocket 4 can be adjusted to fit springs of various thicknesses, and the straps or tongues 11 can also be bent where they join with the pocket 4 so as to fit the spring S. The wings 7 provide extensible sides for the pocket to conceal the sponge at the various adjustments of the walls 5 and pocket.

Having thus described the invention, what is claimed as new is;

1. A lubricator having a pocket to fit a laminated spring, an absorbent lubricant holding filler pressed in the pocket to expand against the spring, straps extending from the pocket to overlap the spring, and retaining means for holding the straps and pocket against the spring.

2. A lubricator having lubricant supplying means to bear against one side of a laminated spring, and retaining means for the aforesaid means to extend to and bear against the opposite side of the spring and exert tension away from the spring, and lubricant supplying means to draw said supplying means against the spring.

3. A lubricator having lubricant supplying means to bear against one side of a laminated spring, and retaining means for the aforesaid means including a spring to bear against the laminated spring and exert tension away from the laminated spring to pull the lubricant supplying means thereagainst.

4. A lubricator having lubricant supplying means to fit one side of a laminated spring, straps extending from said means to overlap the spring, and means for moving said straps toward one another against the spring.

5. A lubricator having a pocket to fit one side of a laminated spring, an absorbent lubricant holding filler within the pocket, straps extending from the pocket to overlap the spring, and means for moving said straps toward one another against the spring.

6. A lubricator comprising lubricant supplying means to fit one side of a laminated spring, straps extending from said means to overlap the spring, and means for moving the straps toward one another against the spring and to pull the lubricant supplying means against the spring.

7. A lubricator embodying lubricant supplying means to fit one side of a laminated spring, portions extending therefrom to overlap the spring, and spring means connected to said portions to bear against said spring for drawing the lubricant supplying means thereagainst.

8. A lubricator embodying lubricant supplying means to fit one side of a laminated spring, straps extending from said means to extend across said spring, and spring means between and connected to said straps to bear against the opposite side of said spring for drawing the lubricant supplying means thereagainst.

9. A lubricator embodying lubricant supplying means to fit one side of a laminated spring, straps extending from said means, means connecting said straps to move them toward one another, and a spring to be disposed between the last named means and aforesaid spring to separate them.

10. A lubricator embodying lubricant supplying means to fit one side of a laminated spring, spring means to bear against the opposite side of said spring to exert tension away from said means, and means connected to the first-named means and extending to and engaging the spring whereby the spring means draws the lubricant supplying means against the spring.

11. A lubricant embodying a lubricant supplying means to fit one side of a laminated spring, a bowed spring adapted to bear at its ends against the opposite side of the laminated spring, and means connecting said means and intermediate portion of the bowed spring.

12. A lubricator embodying lubricant supplying means to fit one side of a laminated spring, straps extending from said means, a securing element connecting said straps, and a bowed spring having its intermediate portion engageable with said securing element to bear at its ends against the opposite side of the laminated spring.

13. A lubricator having a pocket adjustable in size to adjust its mouth to the width of a laminated spring, and a compressible and expansible lubricant holding filler in said pocket to expand through the mouth of the pocket against the spring and to adjust itself to the size of the pocket, and means for holding said pocket against the spring.

14. A lubricator embodying a pocket adjustable to the width of a laminated spring to fit one side thereof, an absorbent lubricant holding filler within the pocket, and means for holding said pocket against the spring, said pocket inclosing said filler at all sides excepting at the mouth.

15. A lubricator embodying a pocket having relatively adjustable sides to fit laminated springs of different thicknesses, and lubricant holding means inclosed between said sides and expansible from between said sides to press against the spring and to also adjust itself to the adjustment of said sides.

16. A lubricator according to claim 15 and also embodying in combination, retaining straps extending from said sides to overlap with the spring.

17. A lubricator embodying a pocket having walls relatively adjustable to adjust the mouth of the pocket to the width of a laminated spring, and an absorbent lubricant holding filler within the pocket to bear against the edges of the spring leaves, said pocket inclosing said filler at all sides excepting at the mouth of the pocket.

18. A lubricator according to claim 17 and also having in combination, retaining straps extending from said walls to overlap the spring.

19. A lubricator embodying a pocket having relatively adjustable walls and extensible sides between them, and a lubricant holding filler within the pocket to bear against the edges of a laminated spring and surrounded and inclosed by said walls and sides.

20. A lubricator embodying a pocket having opposite walls bendable toward and away from one another to the width of a laminated spring, and a lubricant holding filler within the pocket to bear against the edges of the spring.

21. A lubricator embodying a pocket having opposite walls bendable toward and away from one another and provided with overlapping portions forming extensible sides, and a lubricant holding filler in said pocket.

22. A lubricator embodying a pocket having opposite walls bendable toward and away from one another and provided with overlapping portions forming extensible sides, an absorbent lubricant holding filler in said pocket, and retaining straps extending from said walls and bendable relative thereto.

23. A lubricator according to claim 22 and also including in combination, securing means for moving the straps toward one another, and spring means to be disposed between said securing means and an object between said pocket and securing means.

24. A lubricator embodying a pocket to fit one side of a laminated spring, an absorbent lubricant holding filler in said pocket, retaining means connected to the pocket for holding it against the spring, and means carried by the pocket for injecting lubricant therein to said filler.

In testimony whereof, I hereunto set my hand this 18th day of April, 1918.

RAYMOND W. SEELYE.

Copies of this patent may be obtained for five cents each, by addressing the "Commissioner of Patents, Washington, D. C."